United States Patent
Peng et al.

(10) Patent No.: US 10,301,467 B2
(45) Date of Patent: May 28, 2019

(54) FLEXIBLE, UV RESISTANT POLY(PHENYLENE ETHER) COMPOSITION AND INSULATED CONDUCTOR AND JACKETED CABLE COMPRISING IT

(71) Applicant: SABIC GLOBAL TECHNOLOGIES B.V., Bergen op Zoom (NL)

(72) Inventors: Hui Peng, Shanghai (CN); Wei Shan, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/084,736

(22) PCT Filed: Feb. 3, 2017

(86) PCT No.: PCT/IB2017/050612
§ 371 (c)(1),
(2) Date: Sep. 13, 2018

(87) PCT Pub. No.: WO2017/158446
PCT Pub. Date: Sep. 21, 2017

(65) Prior Publication Data
US 2019/0071567 A1    Mar. 7, 2019

Related U.S. Application Data

(60) Provisional application No. 62/309,478, filed on Mar. 17, 2016.

(51) Int. Cl.
*C08L 71/12* (2006.01)
*H01B 3/44* (2006.01)
(Continued)

(52) U.S. Cl.
CPC .......... *C08L 71/123* (2013.01); *H01B 3/427* (2013.01); *H01B 3/441* (2013.01); *H01B 3/46* (2013.01);
(Continued)

(58) Field of Classification Search
CPC .......... H01B 3/427; H01B 3/46; H01B 3/441; H01B 3/42; H01B 7/295; C08L 71/123
See application file for complete search history.

(56) References Cited

U.S. PATENT DOCUMENTS

| 3,375,297 A | 3/1968 | Barth et al. |
| 3,631,126 A | 12/1971 | Snodgrass et al. |

(Continued)

FOREIGN PATENT DOCUMENTS

| WO | 2008060738 | 5/2008 |
| WO | 2013120306 | 8/2013 |

(Continued)

OTHER PUBLICATIONS

Plastics Additive Handbook, 5th Edition, Cincinnati: Hanser Gardner Publications, Inc. (2001), pp. 206-238.
(Continued)

*Primary Examiner* — Hoa C Nguyen
*Assistant Examiner* — Amol H Patel
(74) *Attorney, Agent, or Firm* — Cantor Colburn LLP

(57) ABSTRACT

A composition includes specific amounts of a poly(phenylene ether), a hydrogenated block copolymer of an alkenyl aromatic monomer and a conjugated diene, a polypropylene, a low molecular weight polybutene, a flame retardant, an ultraviolet absorbing agent, and a poly(alkylene oxide). The composition is useful as an insulation or jacketing material for wires and cables.

18 Claims, 2 Drawing Sheets

(51) Int. Cl.
  *H01B 7/295* (2006.01)
  *H01B 3/46* (2006.01)
  *H01B 3/42* (2006.01)
(52) U.S. Cl.
  CPC .......... *H01B 7/295* (2013.01); *C08L 2201/02* (2013.01); *C08L 2201/08* (2013.01); *C08L 2203/202* (2013.01); *C08L 2205/025* (2013.01); *C08L 2205/035* (2013.01)

(56) References Cited

U.S. PATENT DOCUMENTS

| | | | |
|---|---|---|---|
| 4,224,209 | A | 9/1980 | Cooper et al. |
| 4,683,255 | A | 7/1987 | Sugio et al. |
| 6,015,510 | A | 1/2000 | Jacobson et al. |
| 6,025,419 | A | 2/2000 | Kasowski et al. |
| 7,018,570 | B2 | 3/2006 | Haruna et al. |
| 7,125,920 | B2 | 10/2006 | Negishi et al. |
| 7,157,586 | B2 | 1/2007 | Wood et al. |
| 7,622,522 | B2 * | 11/2009 | Qiu ........................ H01B 3/441 524/100 |
| 8,017,697 | B2 | 9/2011 | Carrillo et al. |
| 8,669,332 | B2 | 3/2014 | Carrillo et al. |
| 9,074,086 | B1 * | 7/2015 | Levasalmi ............... C08L 23/12 |
| 9,175,160 | B2 * | 11/2015 | Peters ..................... C08L 59/02 |
| 2006/0131052 | A1 | 6/2006 | Mhetar et al. |
| 2009/0133896 | A1 * | 5/2009 | Kosaka ................... H01B 3/427 |
| 2013/0253105 | A1 * | 9/2013 | Shan ..................... C08K 5/3492 524/100 |
| 2013/0261237 | A1 * | 10/2013 | Qiu ........................ C08L 53/02 524/210 |
| 2015/0056450 | A1 * | 2/2015 | Shan ....................... C08K 3/22 428/391 |
| 2015/0252214 | A1 * | 9/2015 | Shan ....................... C08L 23/12 524/91 |

FOREIGN PATENT DOCUMENTS

| | | |
|---|---|---|
| WO | 2013121363 | 8/2013 |
| WO | 2014026925 | 2/2014 |
| WO | 2014039066 | 3/2014 |

OTHER PUBLICATIONS

International Search Report for International Application No. PCT/IB2017/050612; International Filing Date: Feb. 3, 2017; dated Apr. 21, 2017; 6 pages.

Written Opinion of the International Searching Authority for International Application No. PCT/IB2017/050612; International Filing Date: Feb. 3, 2017; dated Apr. 21, 2017; 7 pages.

* cited by examiner

FLEXIBLE, UV RESISTANT POLY(PHENYLENE ETHER) COMPOSITION AND INSULATED CONDUCTOR AND JACKETED CABLE COMPRISING IT

CROSS REFERENCE TO RELATED APPLICATIONS

This application is a National Stage application of PCT/IB2017/050612, filed Feb. 3, 2017, which claims the benefit of U.S. Provisional Application No. 62/309,478, filed Mar. 17, 2016, both of which are incorporated by reference in their entirety herein.

BACKGROUND OF THE INVENTION

In the consumer electronics market, insulated conductors and jacketed cables are widely used to charge devices, and to transfer data to and from devices. Devices are often sold in a variety of colors, with matching colored insulated conductors and/or jacketed cables. Insulation and jacketing compositions containing poly(phenylene ether)s are known to exhibit many desirable properties, including flexibility, heat resistance, flame retardancy, and colorability. However, light-colored versions of these compositions can exhibit undesirable color changes (e.g., yellowing) on exposure to ultraviolet radiation. And while the incorporation of ultraviolet absorbers to such compositions can reduce unwanted color changes, relatively high concentrations of the ultraviolet absorbers can be required and be accompanied by unwanted migration of the ultraviolet absorber to the surface of an insulated conductor or jacketed cable. There remains a need for light-colored poly(phenylene ether)-containing compositions that exhibit improved stability to ultraviolet radiation for a given amount of ultraviolet absorber.

BRIEF SUMMARY OF EMBODIMENTS OF THE INVENTION

One embodiment is a composition, comprising: 15 to 45 parts by weight of a poly(phenylene ether); 5 to 50 parts by weight of a hydrogenated block copolymer of an alkenyl aromatic monomer and a conjugated diene; 1 to 15 parts by weight of a polypropylene; 2 to 10 parts by weight of a polybutene having a number average molecular weight of 500 to 1500 grams/mole; 10 to 45 parts by weight of a flame retardant; 0.5 to 10 parts by weight of an ultraviolet absorbing agent; and 0.5 to 10 parts by weight of a poly(alkylene oxide); wherein all parts by weight are based on 100 parts by weight total of flame retardants and polymers other than the poly(alkylene oxide).

Another embodiment is an insulated conductor, comprising: a conductor; and an insulating covering disposed over the conductor; wherein the insulating covering comprises a composition comprising 15 to 45 parts by weight of a poly(phenylene ether); 5 to 50 parts by weight of a hydrogenated block copolymer of an alkenyl aromatic monomer and a conjugated diene; 1 to 15 parts by weight of a polypropylene; 2 to 10 parts by weight of a polybutene having a number average molecular weight of 500 to 1500 grams/mole; 10 to 45 parts by weight of a flame retardant; 0.5 to 10 parts by weight of an ultraviolet absorbing agent; and 0.5 to 10 parts by weight of a poly(alkylene oxide); wherein all parts by weight are based on 100 parts by weight total of flame retardants and polymers other than the poly(alkylene oxide).

Another embodiment is a jacketed cable comprising: a conductor; an insulating covering surrounding the conductor; and a jacket surrounding the insulation; wherein the jacket comprises a composition comprising 15 to 45 parts by weight of a poly(phenylene ether); 5 to 50 parts by weight of a hydrogenated block copolymer of an alkenyl aromatic monomer and a conjugated diene; 1 to 15 parts by weight of a polypropylene; 2 to 10 parts by weight of a polybutene having a number average molecular weight of 500 to 1500 grams/mole; 10 to 45 parts by weight of a flame retardant; 0.5 to 10 parts by weight of an ultraviolet absorbing agent; and 0.5 to 10 parts by weight of a poly(alkylene oxide); wherein all parts by weight are based on 100 parts by weight total of flame retardants and polymers other than the poly(alkylene oxide).

These and other embodiments are described in detail below.

BRIEF DESCRIPTION OF THE DRAWINGS

Referring now to the drawings wherein like elements are numbered alike in several FIGURES.

DETAILED DESCRIPTION OF THE INVENTION

Figure 1:
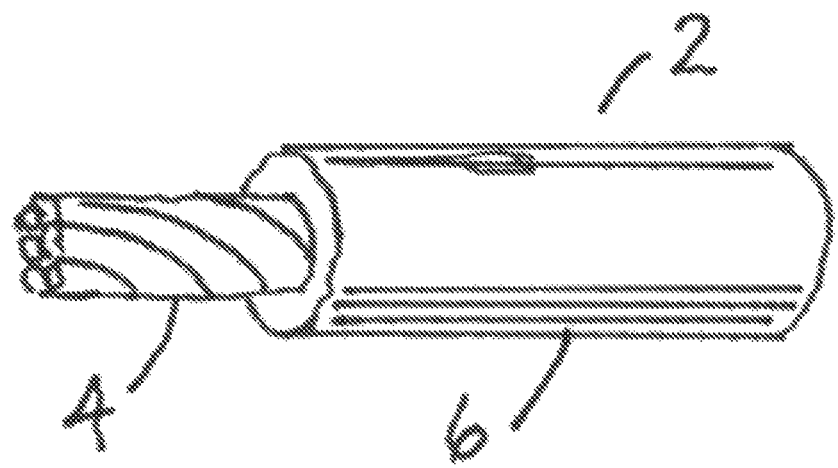
FIG. 1 is a side view of an insulated conductor.

The present inventors have determined that small amounts of poly(alkylene oxide), when used in conjunction with ultraviolet absorbing agents, can improve the ultraviolet stability of flexible poly(phenylene ether) compositions. This advantage can be used to reduce the content of ultraviolet absorbing agent without compromising ultraviolet stability, or to improve ultraviolet stability without increasing the content of ultraviolet absorbing agent.

One embodiment is a composition, comprising: 15 to 45 parts by weight of a poly(phenylene ether); 5 to 50 parts by weight of a hydrogenated block copolymer of an alkenyl aromatic monomer and a conjugated diene; 1 to 15 parts by weight of a polypropylene; 2 to 10 parts by weight of a polybutene having a number average molecular weight of 500 to 1500 grams/mole; 10 to 45 parts by weight of a flame retardant; 0.5 to 10 parts by weight of an ultraviolet absorbing agent; and 0.5 to 10 parts by weight of a poly(alkylene oxide); wherein all parts by weight are based on 100 parts by weight total of flame retardants and polymers other than the poly(alkylene oxide).

The composition comprises a poly(phenylene ether). Poly(phenylene ether)s include those comprising repeating structural units having the formula

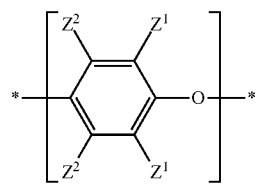

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxyl group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

In some embodiments, the poly(phenylene ether) comprises a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

In some embodiments, the poly(phenylene ether)-polysiloxane block copolymer is prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure

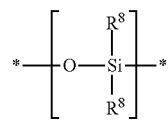

wherein each occurrence of $R^8$ is independently hydrogen, $C_1$-$C_{12}$ hydrocarbyl or $C_1$-$C_{12}$ halohydrocarbyl; and two terminal units having the structure

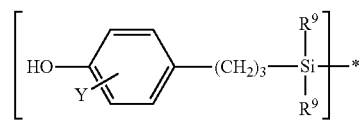

wherein Y is hydrogen, $C_1$-$C_{12}$ hydrocarbyl, $C_1$-$C_{12}$ hydrocarbyloxy, or halogen, and wherein each occurrence of $R^9$ is independently hydrogen, $C_1$-$C_{12}$ hydrocarbyl or $C_1$-$C_{12}$ halohydrocarbyl. In a very specific embodiment, each occurrence of $R^8$ and $R^9$ is methyl, and Y is methoxyl.

In some embodiments, the monohydric phenol comprises 2,6-dimethylphenol, and the hydroxyaryl-terminated polysiloxane has the structure

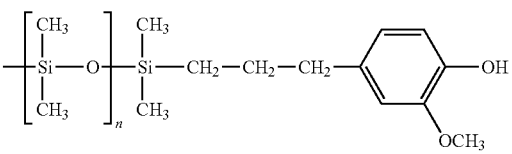

wherein n is, on average, 5 to 100, or 30 to 60.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. Nos. 8,017,697 and 8,669,332 to Carrillo et al.

In some embodiments, the poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.65 deciliter per gram, or 0.35 to 0.5 deciliter per gram, or 0.4 to 0.5 deciliter per gram. In some embodiments, the poly(phenylene ether) is a poly(2,6-dimethyl-1,4-phenylene ether) having an intrinsic viscosity of 0.35 to 0.5 deciliter per gram. In some embodiments, the poly(phenylene ether) has an intrinsic viscosity of 0.35 to 0.5 deciliter per gram and comprises poly(phenylene ether) homopolymer and poly(phenylene ether)-polysiloxane block copolymer.

In some embodiments, the poly(phenylene ether) comprises a homopolymer or copolymer of monomers selected from the group consisting of 2,6-dimethylphenol, 2,3,6-trimethylphenol, and combinations thereof. In some embodiments, the poly(phenylene ether) comprises a poly(phenylene ether)-polysiloxane block copolymer. In these embodiments, the poly(phenylene ether)-polysiloxane block copolymer can, for example, contribute 0.05 to 2 weight percent, or 0.1 to 1 weight percent, or 0.2 to 0.8 weight percent, of siloxane groups to the composition as a whole.

Suitable poly(phenylene ether) homopolymers are commercially available as, for example, PPO™ 640 and 646 from SABIC, and XYRON™ S201A and S202A from Asahi Kasei Chemicals Corporation.

The composition comprises the poly(phenylene ether) in an amount of 15 to 45 parts by weight, based on 100 parts by weight total of flame retardants and polymers other than the poly(alkylene oxide). Within this range, the poly(phenylene ether) amount can be 15 to 35 parts by weight, specifically 17 to 30 parts by weight.

In addition to the poly(phenylene ether), the composition comprises a hydrogenated block copolymer of an alkenyl aromatic monomer and a conjugated diene. For brevity, this component is referred to as the "hydrogenated block copolymer". The hydrogenated block copolymer can comprise 10 to 90 weight percent of poly(alkenyl aromatic) content and 90 to 10 weight percent of hydrogenated poly(conjugated diene) content, based on the weight of the hydrogenated block copolymer. In some embodiments, the hydrogenated block copolymer is a low poly(alkenyl aromatic content) hydrogenated block copolymer in which the poly(alkenyl aromatic) content is 10 to less than 40 weight percent, or 20 to 35 weight percent, or 25 to 35 weight percent, or 30 to 35 weight percent, all based on the weight of the low poly(alkenyl aromatic) content hydrogenated block copolymer. In other embodiments, the hydrogenated block copolymer is a high poly(alkenyl aromatic content) hydrogenated block copolymer in which the poly(alkenyl aromatic) content is 40 to 90 weight percent, or 50 to 80 weight percent, or 60 to 70 weight percent, all based on the weight of the high poly(alkenyl aromatic content) hydrogenated block copolymer.

In some embodiments, the hydrogenated block copolymer has a weight average molecular weight of 40,000 to 400,000 atomic mass units. The number average molecular weight and the weight average molecular weight can be determined by gel permeation chromatography and based on comparison to polystyrene standards. In some embodiments, the hydrogenated block copolymer has a weight average molecular weight of 200,000 to 400,000 atomic mass units, or 220,000 to 350,000 atomic mass units. In other embodiments, the hydrogenated block copolymer has a weight average molecular weight of 40,000 to 200,000 atomic mass units, or 40,000 to 180,000 atomic mass units, or 40,000 to 150,000 atomic mass units.

The alkenyl aromatic monomer used to prepare the hydrogenated block copolymer can have the structure

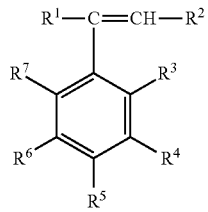

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$, $R^5$, and $R^6$ each independently represent a hydrogen atom, a $C_1$-$C_8$ alkyl group, or a $C_2$-$C_8$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene is 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, or at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination thereof.

In some embodiments, the hydrogenated block copolymer comprises a polystyrene-poly(ethylene-butylene-styrene)-polystyrene tapered block copolymer. For brevity, this component is referred to as the "tapered block copolymer". In some embodiments, the tapered block copolymer has a polystyrene content of 30 to 70 weight percent, or 35 to 65 weight percent, based on the weight of the tapered block copolymer. In some embodiments, the tapered block copolymer has a melt flow rate of 0 to 10 grams per 10 minutes, measured at 260° C. and 5 kilogram load according to ASTM D1238-13. Tapered block copolymers are commercially available as, for example, KRATON™ A1535 and A1536 Resins from Kraton Performance Polymers.

The hydrogenated block copolymer can consist of polystyrene-poly(ethylene-butylene)-polystyrene triblock copolymer. Alternatively, the hydrogenated block copolymer can comprise polystyrene-poly(ethylene-butylene)-polystyrene triblock copolymer and tapered block copolymer. For example, the 5 to 40 parts by weight of the hydrogenated block copolymer can comprise 3 to 12 parts by weight of polystyrene-poly(ethylene-butylene)-polystyrene triblock copolymer and 22 to 35 parts by weight of the tapered block copolymer. Alternatively, the hydrogenated block copolymer can consist of the tapered block copolymer.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In some embodiments, the hydrogenated block copolymer includes the residue of one or more acid functionalizing agents, such as maleic anhydride.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Performance Polymers Inc. as KRATON™ G1701 (having about 37 weight percent polystyrene) and G1702 (having about 28 weight percent polystyrene); the polystyrene-poly(ethylene-butylene)-polystyrene triblock copolymers available from Kraton Performance Polymers Inc. as KRATON™ G1641 (having about 33 weight percent polystyrene), G1650 (having about 30 weight percent polystyrene), G1651 (having about 33 weight percent polystyrene), and G1654 (having about 31 weight percent polystyrene); and the polystyrene-poly(ethylene-ethylene/propylene)-polystyrene triblock copolymers available from Kuraray as SEPTON™ S4044, S4055, S4077, and S4099. Additional commercially available hydrogenated block copolymers include polystyrene-poly(ethylene-butylene)-polystyrene (SEBS) triblock copolymers available from Dynasol as CALPRENE™ H6140 (having about 31 weight percent polystyrene), H6170 (having about 33 weight percent polystyrene), H6171 (having about 33 weight percent polystyrene), and H6174 (having about 33 weight percent polystyrene), and from Kuraray as SEPTON™ 8006 (having about 33 weight percent polystyrene) and 8007 (having about 30 weight percent polystyrene); polystyrene-poly(ethylene-butylene-styrene)-polystyrene tapered block copolymers available from Kraton Performance Polymers as KRATON™ A1535 (having 56.3-60.3 weight percent polystyrene) and A1536 (having 37-44 weight percent polystyrene); polystyrene-poly(ethylene-propylene)-polystyrene (SEPS) copolymers available from Kuraray as SEPTON™ 2006 (having about 35 weight percent polystyrene) and 2007 (having about 30 weight percent polystyrene); and oil-extended compounds of these hydrogenated block copolymers available from Kraton Performance Polymers Inc. as KRATON™ G4609 (containing about 45% mineral oil, and the SEBS having about 33 weight percent polystyrene) and G4610 (containing about 31% mineral oil, and the SEBS having about 33 weight percent polystyrene); and from Asahi as TUFTEC™ H1272 (containing about 36% oil, and the SEBS having about 35 weight percent polystyrene). Mixtures of two of more hydrogenated block copolymers can be used.

The composition comprises the hydrogenated block copolymer in an amount of 5 to 40 parts by weight, based on 100 parts by weight total of flame retardants and polymers other than the poly(alkylene oxide). Within this range, the hydrogenated block copolymer amount can depend on the poly(phenylene ether) type and the flame retardant type. In some embodiments in which the poly(phenylene ether) comprises a poly(phenylene ether) homopolymer and a poly(phenylene ether)-polysiloxane block copolymer, and the flame retardant comprises a metal hydroxide, the composition comprises the hydrogenated block copolymer in an amount of 7 to 20 parts by weight, or 7 to 17 parts by weight, based on 100 parts by weight total of flame retardants and polymers other than the poly(alkylene oxide). And in some embodiments in which the poly(phenylene ether) comprises a poly(phenylene ether) homopolymer, and the flame retardant comprises a metal dialkylphosphinate and a melamine polyphosphate, the composition comprises the hydrogenated block copolymer in an amount of 25 to 40 parts by weight, or 30 to 40 parts by weight, based on 100 parts by weight total of flame retardants and polymers other than the poly(alkylene oxide).

In addition to the poly(phenylene ether) and the hydrogenated block copolymer, the composition comprises a polypropylene. As used herein, the term "polypropylene" refers to a propylene homopolymer. The polypropylene can be atactic, syndiotactic, isotactic, or a combination thereof. In some embodiments, the polypropylene is an atactic polypropylene having a melt flow rate of 4 to 16 grams per 10 minutes, or 5 to 12 grams per 10 minutes, measured at 230° C. and 2.16 kilogram load according to ASTM D1238-13.

Suitable polypropylenes are commercially available as, for example, PP 570P Resin from SABIC, and PP1304E3 Resin from ExxonMobil.

The composition comprises the polypropylene in an amount of 1 to 15 parts by weight, based on 100 parts by weight total of flame retardants and polymers other than the poly(alkylene oxide). Within this range, the polypropylene amount can be 2 to 7 parts by weight.

In addition to the poly(phenylene ether), the hydrogenated block copolymer, and the polypropylene, the composition comprises a polybutene having a number average molecular weight of 500 to 1500 grams/mole. As used herein, the term "polybutene" refers to a polymer comprising at least 75 weight percent of units, or at least 80 weight percent of units, derived from 1-butene, 2-butene, 2-methylpropene (isobutene), or a combination thereof. The polybutene may be a homopolymer or a copolymer. In some embodiments, the polybutene consists of units derived from 1-butene, 2-butene, 2-methylpropene (isobutene), or a combination thereof. In other embodiments, the polybutene is a copolymer that comprises 1 to 25 weight percent of repeat units derived from a copolymerizable monomer such as ethylene, propylene, or 1-octene. In some embodiments, the polybutene is a homopolymer of 2-methylpropene. In other embodiments, the polybutene is a copolymer of 2-methylpropene with 1-butene and/or 2-butene. In still other embodiments, the polybutene is a combination of a homopolymer of 2-methylpropene, and a copolymer of 2-methylpropene with 1-butene and/or 2-butene.

The polybutene has a number average molecular weight of 500 to 1500 grams/mole. Number average molecular weight can be determined by gel permeation chromatography using polystyrene standards. Within the range of 500 to 1500 grams/mole, the number average molecular weight can be 600 to 1400 grams/mole, or 600 to 1200 grams/mole.

Suitable polybutenes are commercially available as, for example, INDOPOL™ H-50 Resin from INEOS, and PB800 Resin from Daelim Industrial Co. Ltd.

The composition comprises the polybutene in an amount of 2 to 10 parts by weight, based on 100 parts by weight total of flame retardants and polymers other than the poly(alkylene oxide). Within this range, the polybutene amount can be 3 to 9 parts by weight.

In addition to the poly(phenylene ether), the hydrogenated block copolymer, the polypropylene, and the polybutene, the composition comprises a flame retardant. A flame retardant is a chemical compound or mixture of chemical compounds capable of improving the flame retardancy of the composition. Suitable flame retardants include organophosphate esters, metal dialkylphosphinates, bis(phenoxy)phosphazenes, nitrogen-containing flame retardants, metal hydroxides, and combinations thereof.

In some embodiments, the flame retardant comprises an organophosphate ester. Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis (diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), t-butylphenyl diphenyl phosphates (CAS Reg. No. 56803-37-3), bis(t-butylphenyl) phenyl phosphates (CAS Reg. No. 65652-41-7), tris(t-butylphenyl) phosphates (CAS Reg. No. 78-33-1), and combinations thereof.

In some embodiments, the flame retardant comprises a metal dialkylphosphinate. As used herein, the term "metal dialkylphosphinate" refers to a salt comprising at least one metal cation and at least one dialkylphosphinate anion. In some embodiments, the metal dialkylphosphinate has the formula

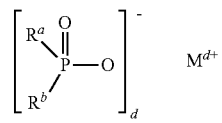

wherein $R^a$ and $R^b$ are each independently $C_1$-$C_6$ alkyl; M is calcium, magnesium, aluminum, or zinc; and d is 2 or 3. Examples of $R^a$ and $R^b$ include methyl, ethyl, n-propyl, isopropyl, n-butyl, tert-butyl, and n-pentyl. In some embodiments, $R^a$ and $R^b$ are ethyl, M is aluminum, and d is 3 (that is, the metal dialkylphosphinate is aluminum tris(diethylphosphinate)).

In some embodiments, the flame retardant comprises a bis(phenoxy)phosphazene. The bis(phenoxy)phosphazene can be oligomeric or polymeric, and it can be cyclic or linear. In some embodiments, the bis(phenoxy)phosphazene is cyclic and has the structure

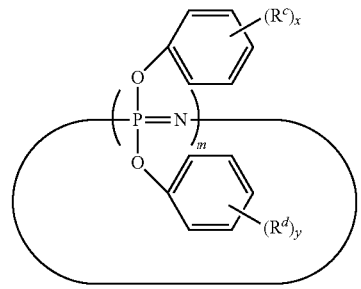

wherein m is an integer of 3 to 25; x and y are each independently 0, 1, 2, 3, 4, or 5; and each occurrence of $R^c$ and $R^d$ is halogen, $C_1$-$C_{12}$ alkyl, or $C_1$-$C_{12}$ alkoxyl.

In other embodiments, the bis(phenoxy)phosphazene is linear and has the structure

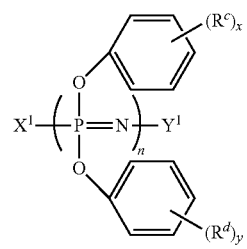

wherein n is an integer from 3 to 10,000; $X^1$ represents a —N=P(OPh)$_3$ group or a —N=P(O)(OPh) group wherein Ph represents a phenyl group; $Y^1$ represents a —P(OPh)$_4$ group or a —P(O)(OPh)$_2$ group; x and y are each independently 0, 1, 2, 3, 4, or 5; and each occurrence of $R^c$ and $R^c$ is halogen, $C_1$-$C_{12}$ alkyl, or $C_1$-$C_{12}$ alkoxyl.

In some embodiments, the flame retardant comprises a nitrogen-containing flame retardant. Nitrogen-containing flame retardants include those comprising a nitrogen-containing heterocyclic base and a phosphate or pyrophosphate or polyphosphate acid. In some embodiments, the nitrogen-containing flame retardant has the formula

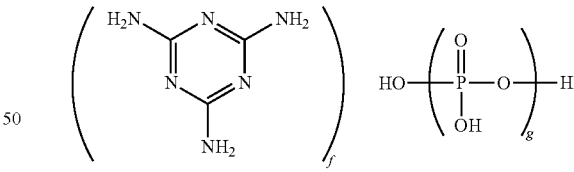

wherein g is 1 to 10,000, and the ratio of f to g is 0.5:1 to 1.7:1, specifically 0.7:1 to 1.3:1, more specifically 0.9:1 to 1.1:1. It will be understood that this formula includes species in which one or more protons are transferred from the phosphate group(s) to the melamine group(s). When g is 1, the nitrogen-containing flame retardant is melamine phosphate (CAS Reg. No. 20208-95-1). When g is 2, the nitrogen-containing flame retardant is melamine pyrophosphate (CAS Reg. No. 15541 60-3). When g is, on average, greater than 2, the nitrogen-containing flame retardant is a melamine polyphosphate (CAS Reg. No. 56386-64-2). In some embodiments, the nitrogen-containing flame retardant is melamine pyrophosphate, melamine polyphosphate, or a mixture thereof. In some embodiments in which the nitrogen-containing flame retardant is melamine polyphosphate, g has an average value of greater than 2 to 10,000, specifically 5 to 1,000, more specifically 10 to 500. In some embodiments in which the nitrogen-containing flame retardant is melamine polyphosphate, g has an average value of greater than 2 to 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in U.S. Pat. No. 6,015,510 to Jacobson et al. In some embodiments, the nitrogen-containing flame retardant comprises melamine cyanurate.

In some embodiments, the flame retardant comprises a metal hydroxide. Suitable metal hydroxides include all those capable of providing fire retardancy, as well as combinations of such metal hydroxides. The metal hydroxide can be chosen to have substantially no decomposition during processing of the fire additive composition and/or flame retardant thermoplastic composition. Substantially no decomposition is defined herein as amounts of decomposition that do not prevent the flame retardant additive composition from providing the desired level of fire retardancy. Exemplary metal hydroxides include, but are not limited to, magnesium hydroxide (for example, CAS Reg. No. 1309-42-8), aluminum hydroxide (for example, CAS Reg. No. 21645-51-2), cobalt hydroxide (for example, CAS Reg. No. 21041-93-0), and combinations thereof. In some embodiments, the metal hydroxide comprises magnesium hydroxide. In some embodiments the metal hydroxide has an average particle size less than or equal to 10 micrometers and/or a purity greater than or equal to 90 weight percent. In some embodiments it is desirable for the metal hydroxide to contain substantially no water, for example as evidenced by a weight loss of less than 1 weight percent upon drying at 120° C. for 1 hour. In some embodiments the metal hydroxide can be coated, for example, with stearic acid or other fatty acid.

In some embodiments, the flame retardant is selected from the group consisting of magnesium dihydroxides, metal dialkylphosphinates, melamine polyphosphates, and combinations thereof.

The composition comprises the flame retardant in an amount of 10 to 45 parts by weight, based on 100 parts by weight total of flame retardants and polymers other than the poly(alkylene oxide). In some embodiments in which the flame retardant comprises a metal hydroxide, the flame retardant amount can be 20 to 40 parts by weight, or 28 to 38 parts by weight. In some embodiments in which the flame retardant comprises a metal dialkylphosphinate and melamine polyphosphate, the flame retardant amount can be 10 to 25 parts by weight, or 14 to 24 parts by weight.

In addition to the poly(phenylene ether), the hydrogenated block copolymer, the polypropylene, the polybutene, and the flame retardant, the composition comprises an ultraviolet absorbing agent. Suitable classes of ultraviolet absorbing agents (UV absorbers) include benzophenone ultraviolet absorbing agents (including 2-hydroxybenzophenones and hydroxyphenylbenzophenones), benzotriazole ultraviolet absorbing agents (including 2-(2'-hydroxyphenyl)benzotriazoles), cinnamate ultraviolet absorbing agents, cyanoacrylate ultraviolet absorbing agents, 2-(2'-hydroxyphenyl)-1,3,5-triazine ultraviolet absorbing agents, benzoxazinone ultraviolet absorbing agents, and combinations thereof. Additional classes of ultraviolet radiation stabilizers are described in H. Zweifel, Ed., "Plastics Additive Handbook", 5th Edition, Cincinnati: Hanser Gardner Publications, Inc. (2001), pages 206-238.

In some embodiments, the ultraviolet absorbing agent is selected from the group consisting of benzotriazole ultraviolet absorbing agents, 2-(2'-hydroxyphenyl)-1,3,5-triazine ultraviolet absorbing agents, benzophenone ultraviolet absorbing agents, oxanilide ultraviolet absorbing agents, cyanoacrylate ultraviolet absorbing agents, and combinations thereof. In some embodiments, the ultraviolet absorbing agent is selected from the group consisting of benzotriazole ultraviolet absorbing agents, 2-(2'-hydroxyphenyl)-1,3,5-triazine ultraviolet absorbing agents, and combinations thereof. Presently preferred ultraviolet absorbing agents include 2,2'-methylene bis[4-(1,1,3,3-tetramethylbutyl)-6-(2H-benzotriazole-2-yl)phenol] (CAS Reg. No. 103597-45-1), 2-(4,6-bis(2,4-dimethylphenyl)-1,3,5-triazin-2-yl)-5-(octyloxy)phenol (CAS Reg. No. 2725-22-6), 2-(4,6-bis((1,1-biphenyl)-4-yl)-1,3,5-triazin-2-yl)-5-((2-ethylhexyl)oxy) phenol (CAS Reg. No. 204583-39-1), 2-(2H-benzotriazol-2-yl)-4,6-bis(1-methyl-1-phenylethyl)phenol (CAS Reg. No. 70321-86-7), 2-(4,6-diphenyl-1,3,3-triazin-2-yl)-5-hexyloxy-phenol (CAS Reg. No. 147315-50-2), and combinations thereof.

The composition comprises the ultraviolet absorbing agent in an amount of 0.5 to 10 parts by weight, based on 100 parts by weight total of flame retardants and polymers other than the poly(alkylene oxide). Within this range, the ultraviolet absorbing agent amount can be 0.5 to 6 parts by weight, or 1 to 4 parts by weight.

In addition to the poly(phenylene ether), the hydrogenated block copolymer, the polypropylene, the polybutene, the flame retardant, and the ultraviolet absorbing agent, the composition comprises a poly(alkylene oxide). As used herein, the term "poly(alkylene oxide)" includes homopolymers of $C_2$-$C_4$ alkylene oxides (such as poly(ethylene oxide)s, poly(propylene oxide)s, poly(butylene oxide)s, and homopolymers of $C_2$-$C_4$ alkylene oxides initiated in the presence of a non-corresponding alcohol, such as pentaerythritol), random copolymers of $C_2$-$C_4$ alkylene oxides (such as random copolymers of ethylene oxide and propylene oxide), block copolymers of $C_2$-$C_4$ alkylene oxides (such as diblock and triblock copolymers of ethylene oxide and propylene oxide), mono($C_1$-$C_{12}$)ethers and di($C_1$-$C_{12}$) ethers of the foregoing (such as poly(ethylene oxide) dibutyl ether and poly(propylene oxide) monobutyl ether), mono ($C_2$-$C_{12}$)esters and di($C_2$-$C_{12}$)esters of the foregoing (such as poly(ethylene oxide) diacetyl ester and poly(propylene oxide) monopropionyl ester), and combinations thereof. In some embodiments, the poly(alkylene oxide) excludes ester linkages.

In some embodiments, the poly(alkylene oxide) is selected from the group consisting of poly(ethylene oxide)s, poly(propylene oxide)s, random copolymers of ethylene oxide and propylene oxide, block copolymers of ethylene oxide and propylene oxide, monoalkyl ethers of the foregoing, dialkyl ethers of the foregoing, and combinations thereof. In a very specific embodiment, the poly(alkylene oxide) comprises a poly(propylene oxide) mono($C_1$-$C_{12}$-alkyl) ether.

In some embodiments, the poly(alkylene oxide) has a number average molecular weight of 300 to 40,000 grams/mole. Within this range, the number average molecular weight can be 300 to 25,000 grams/mole, specifically 500 to 5,000 grams/mole.

The composition comprises the poly(alkylene oxide) in an amount of 0.5 to 10 parts by weight, based on 100 parts by weight total of flame retardants and polymers other than the poly(alkylene oxide). Within this range, the poly(alkylene oxide) amount can be 1 to 6 parts by weight, or 1 to 4 parts by weight.

In some embodiments, the composition further comprises a copolymer of monomers comprising ethylene and a $C_3$-$C_{12}$ alpha-olefin. The $C_3$-$C_{12}$ alpha-olefin can be, for example, 1-butene, 1-hexene, or 1-octene. The $C_3$-$C_{12}$ alpha-olefin content in the copolymer can be, for example, 10 to 50 weight percent. The copolymer can, optionally, further comprise additional monomers, such as maleic anhydride, which can be present in the backbone of the copolymer or as a graft. In some embodiments, the copolymer of monomers comprising ethylene and a $C_3$-$C_{12}$ alpha-olefin comprises a copolymer of ethylene and 1-octene, and a maleic anhydride-grafted copolymer of ethylene and 1-octene.

When present in the composition, the copolymer of monomers comprising ethylene and a $C_3$-$C_{12}$ alpha-olefin can be used in an amount of 5 to 30 parts by weight, based on 100 parts by weight total of flame retardants and polymers other than the poly(alkylene oxide). Within this range, the amount of the copolymer can be 10 to 30 parts by weight, or 20 to 30 parts by weight.

The composition can, optionally, further comprise one or more additives known in the thermoplastics art. For example, the composition can, optionally, further comprise an additive chosen from stabilizers, mold release agents, lubricants, processing aids, drip retardants, hindered amine light stabilizers, cycloaliphatic epoxy resins, dyes, pigments, antioxidants, anti-static agents, mineral oil, metal deactivators, and combinations thereof. When present, such additives are typically used in a total amount of less than or equal to 15 parts by weight, or less than or equal to 12 parts by weight, based on 100 parts by weight total of flame retardants and polymers other than the poly(alkylene oxide). Excluding white pigment, such additives are typically used in a total amount of less than or equal to 5 parts by weight, or less than or equal to 4 parts by weight, or less than or equal to 3 parts by weight, based on 100 parts by weight total of flame retardants and polymers other than the poly(alkylene oxide).

The composition can, optionally, minimize or exclude polymers other than those described herein as required or optional. For example, in some embodiments the composition comprises 0 to 2 parts by weight, or 0 to 1 part by weight, or 0 part by weight, of homopolystyrenes, based on 100 parts by weight total of flame retardants and polymers other than the poly(alkylene oxide). As another example, in some embodiments the composition comprises 0 to 2 parts by weight, or 0 to 1 part by weight, or 0 part by weight, of rubber-modified polystyrenes, based on 100 parts by weight total of flame retardants and polymers other than the poly (alkylene oxide). As another example, in some embodiments the composition comprises 0 to 2 parts by weight, or 0 to 1 part by weight, or 0 part by weight, of polyamides, based on 100 parts by weight total of flame retardants and polymers other than the poly(alkylene oxide).

In a very specific embodiment of the composition, the poly(phenylene ether) is a poly(2,6-dimethyl-1,4-phenylene ether) having an intrinsic viscosity of 0.35 to 0.5 deciliter per gram; the hydrogenated block copolymer comprises a polystyrene-poly(ethylene/butylene)-polystyrene triblock copolymer; the flame retardant comprises magnesium dihydroxide; the ultraviolet absorbing agent comprises a triazine ultraviolet absorbing agent; the poly(alkylene oxide) comprises a poly(propylene oxide) mono($C_1$-$C_{12}$-alkyl) ether; the composition further comprises a copolymer of monomers comprising ethylene and a $C_3$-$C_{12}$ alpha-olefin, wherein the copolymer of monomers comprising ethylene and a $C_3$-$C_{12}$ alpha-olefin comprises a copolymer of ethylene and 1-octene, and a maleic anhydride-grafted copolymer of ethylene and 1-octene; and the composition comprises 17 to 30 parts by weight of the poly(phenylene ether), 7 to 17 parts by weight of the hydrogenated block copolymer, 2 to 7 parts by weight of the polypropylene, 3 to 9 parts by weight of the polybutene, 20 to 30 parts by weight of the copolymer of monomers comprising ethylene and a $C_3$-$C_{12}$ alpha-olefin, 28 to 38 parts by weight of the flame retardant, 1 to 4 parts by weight of the ultraviolet absorbing agent, and 1 to 4 parts by weight of the poly(alkylene oxide).

The composition exhibits a relatively small color shift on exposure to ultraviolet light. For example, in some embodiments the composition exhibits a CIELAB color shift (delta E) of 5 or less, or 4 or less, after 300 hours of xenon arc exposure according to ASTM D4459-12. The resistance to ultraviolet light is particularly useful when the composition is light-colored. For example, in some embodiments, the composition exhibits a lightness value, L*, of 70 to 95, or 70 to 90, measured according to ASTM D2244-15a using a D65 standard illuminant.

One embodiment is an insulated conductor, comprising: a conductor; and an insulating covering disposed over the conductor; wherein the insulating covering comprises a composition comprising 15 to 45 parts by weight of a poly(phenylene ether); 5 to 50 parts by weight of a hydrogenated block copolymer of an alkenyl aromatic monomer and a conjugated diene; 1 to 15 parts by weight of a polypropylene; 2 to 10 parts by weight of a polybutene having a number average molecular weight of 500 to 1500 grams/mole; 10 to 45 parts by weight of a flame retardant; 0.5 to 10 parts by weight of an ultraviolet absorbing agent; and 0.5 to 10 parts by weight of a poly(alkylene oxide); wherein all parts by weight are based on 100 parts by weight total of flame retardants and polymers other than the poly (alkylene oxide). All of the above-described variants of the composition apply as well to the insulated conductor.

Figure 2:
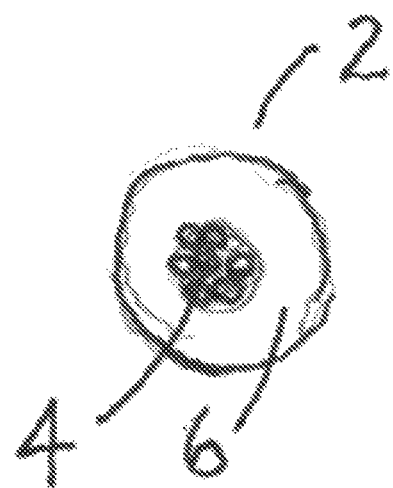
FIG. 2 is a cross-section of an insulated conductor.

FIG. 1 is a side view of an insulated conductor 2 comprising conductor 4 and insulating covering 6 surrounding the conductor. FIG. 2 is a cross-sectional view of the same conductor, with parts similarly labeled. The conductor 4 can be an electrical conductor (e.g., copper wire) or an optical conductor (e.g., glass fiber). The conductor can comprise multiple strands, as shown in FIG. 1, or a single strand.

In a very specific embodiment of the insulated conductor, the poly(phenylene ether) is a poly(2,6-dimethyl-1,4-phenylene ether) having an intrinsic viscosity of 0.35 to 0.5 deciliter per gram; the hydrogenated block copolymer comprises a polystyrene-poly(ethylene/butylene)-polystyrene triblock copolymer; the flame retardant comprises magnesium dihydroxide; the ultraviolet absorbing agent comprises a triazine ultraviolet absorbing agent; the poly(alkylene oxide) comprises a poly(propylene oxide) mono($C_1$-$C_{12}$-alkyl) ether; the composition further comprises a copolymer of monomers comprising ethylene and a $C_3$-$C_{12}$ alpha-olefin, wherein the copolymer of monomers comprising ethylene and a $C_3$-$C_{12}$ alpha-olefin comprises a copolymer of ethylene and 1-octene, and a maleic anhydride-grafted copolymer of ethylene and 1-octene; and the composition comprises 17 to 30 parts by weight of the poly(phenylene ether), 7 to 17 parts by weight of the hydrogenated block copolymer, 2 to 7 parts by weight of the polypropylene, 3 to 9 parts by weight of the polybutene, 20 to 30 parts by weight of the copolymer of monomers comprising ethylene and a $C_3$-$C_{12}$ alpha-olefin, 28 to 38 parts by weight of the flame retardant, 1 to 4 parts by weight of the ultraviolet absorbing agent, and 1 to 4 parts by weight of the poly(alkylene oxide).

One embodiment is a jacketed cable, comprising: a conductor, an insulating covering surrounding the conductor, and a jacket surrounding the insulation; wherein the jacket comprises a composition comprising 15 to 45 parts by weight of a poly(phenylene ether); 5 to 50 parts by weight of a hydrogenated block copolymer of an alkenyl aromatic monomer and a conjugated diene; 1 to 15 parts by weight of a polypropylene; 2 to 10 parts by weight of a polybutene having a number average molecular weight of 500 to 1500 grams/mole; 10 to 45 parts by weight of a flame retardant; 0.5 to 10 parts by weight of an ultraviolet absorbing agent; and 0.5 to 10 parts by weight of a poly(alkylene oxide); wherein all parts by weight are based on 100 parts by weight total of flame retardants and polymers other than the poly (alkylene oxide). All of the above-described variants of the composition apply as well to the jacketed cable. There is no particular limit on the composition of the insulating covering. In some embodiments, the insulating covering comprises the composition as described herein. In other embodiments, the insulating covering comprises a different flexible composition, such as one of those described in U.S. Patent Application Publication No. US 2006/0131052 A1 of Mhetar et al. In still other embodiments, the insulating covering 6 comprises a foamed thermoplastic composition.

Figure 3:
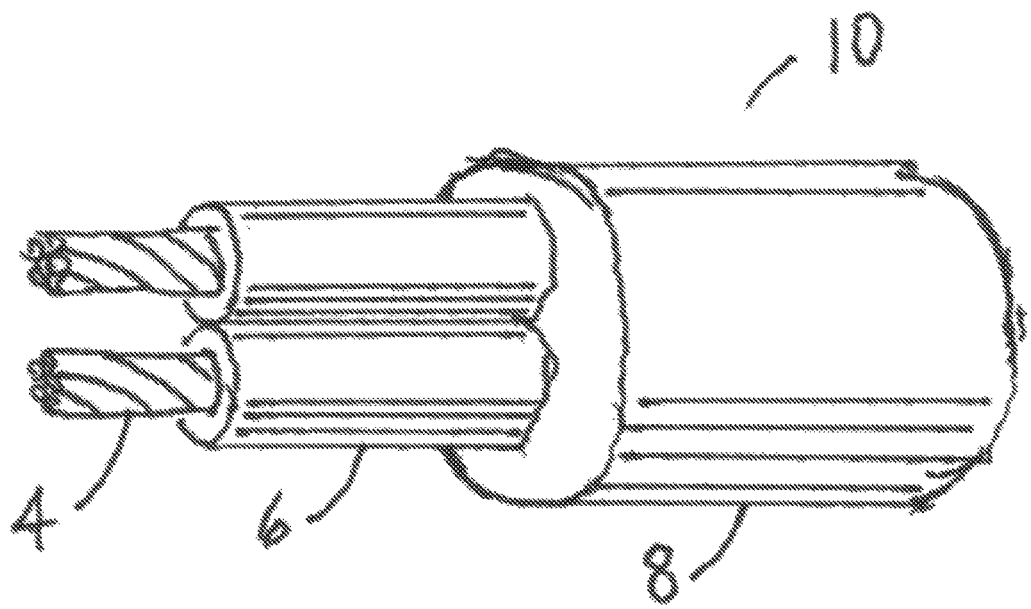
FIG. 3 is a side view of a jacketed cable.

A side view of a jacketed cable is presented in FIG. 3, where cable 10 includes a conductor 4, an insulating covering 6 surrounding the conductor, and jacket 8 surrounding the insulating covering 6. A cross section of the cable is presented in FIG. 4, where parts are similarly labeled. The jacketed cable 1 can be formed by extrusion coating of the conductor 2, with either simultaneous or step-wise extrusion of the conductor with the covering and the jacket.

In a very specific embodiment of the jacketed cable, the poly(phenylene ether) is a poly(2,6-dimethyl-1,4-phenylene ether) having an intrinsic viscosity of 0.35 to 0.5 deciliter per gram; the hydrogenated block copolymer comprises a polystyrene-poly(ethylene/butylene)-polystyrene triblock copolymer; the flame retardant comprises magnesium dihydroxide; the ultraviolet absorbing agent comprises a triazine ultraviolet absorbing agent; the poly(alkylene oxide) comprises a poly(propylene oxide) mono($C_1$-$C_{12}$-alkyl) ether; the composition further comprises a copolymer of monomers comprising ethylene and a $C_3$-$C_{12}$ alpha-olefin, wherein the copolymer of monomers comprising ethylene and a $C_3$-$C_{12}$ alpha-olefin comprises a copolymer of ethylene and 1-octene, and a maleic anhydride-grafted copolymer of ethylene and 1-octene; and the composition comprises 17 to 30 parts by weight of the poly(phenylene ether), 7 to 17 parts by weight of the hydrogenated block copolymer, 2 to 7 parts by weight of the polypropylene, 3 to 9 parts by weight of the polybutene, 20 to 30 parts by weight of the copolymer of monomers comprising ethylene and a $C_3$-$C_{12}$ alpha-olefin, 28 to 38 parts by weight of the flame retardant, 1 to 4 parts by weight of the ultraviolet absorbing agent, and 1 to 4 parts by weight of the poly(alkylene oxide).

The invention includes at least the following embodiments.

Embodiment 1

A composition, comprising: 15 to 45 parts by weight of a poly(phenylene ether); 5 to 50 parts by weight of a hydrogenated block copolymer of an alkenyl aromatic monomer and a conjugated diene; 1 to 15 parts by weight of a polypropylene; 2 to 10 parts by weight of a polybutene having a number average molecular weight of 500 to 1500 grams/mole; 10 to 45 parts by weight of a flame retardant; 0.5 to 10 parts by weight of an ultraviolet absorbing agent; and 0.5 to 10 parts by weight of a poly(alkylene oxide); wherein all parts by weight are based on 100 parts by weight total of flame retardants and polymers other than the poly (alkylene oxide).

Embodiment 2

The composition of embodiment 1, wherein the poly (phenylene ether) is a poly(2,6-dimethyl-1,4-phenylene ether) having an intrinsic viscosity of 0.35 to 0.5 deciliter per gram.

Embodiment 3

The composition of embodiment 1, wherein the poly (phenylene ether) has an intrinsic viscosity of 0.35 to 0.5 deciliter per gram and comprises poly(phenylene ether) homopolymer and poly(phenylene ether)-polysiloxane block copolymer.

Embodiment 4

The composition of any one of embodiments 1-3, wherein the flame retardant is selected from the group consisting of magnesium dihydroxides, metal dialkylphosphinates, melamine polyphosphates, and combinations thereof.

Embodiment 5

The composition of any one of embodiments 1-4, wherein the ultraviolet absorbing agent is selected from the group consisting of benzotriazole ultraviolet absorbing agents, 2-(2'-hydroxyphenyl)-1,3,5-triazine ultraviolet absorbing agents, benzophenone ultraviolet absorbing agents, oxanilide ultraviolet absorbing agents, cyanoacrylate ultraviolet absorbing agents, and combinations thereof.

Embodiment 6

The composition of any one of embodiments 1-5, wherein the poly(alkylene oxide) is selected from the group consisting of poly(ethylene oxide)s, poly(propylene oxide)s, random copolymers of ethylene oxide and propylene oxide, block copolymers of ethylene oxide and propylene oxide, monoalkyl ethers of the foregoing, dialkyl ethers of the foregoing, and combinations thereof.

Embodiment 7

The composition of any one of embodiments 1-6, wherein the poly(alkylene oxide) has a number average molecular weight of 300 to 40,000 grams/mole.

Embodiment 8

The composition of any one of embodiments 1-7, wherein the poly(alkylene oxide) comprises a poly(propylene oxide) mono($C_1$-$C_{12}$-alkyl) ether.

Embodiment 9

The composition of any one of embodiments 1-8, further comprising 5 to 30 parts by weight of a copolymer of monomers comprising ethylene and a $C_3$-$C_{12}$ alpha-olefin.

Embodiment 10

The composition of embodiment 9, wherein the copolymer comprises a copolymer of ethylene and 1-octene, and a maleic anhydride-grafted copolymer of ethylene and 1-octene.

Embodiment 11

The composition of embodiment 1, comprising 17 to 30 parts by weight of the poly(phenylene ether), 7 to 17 parts by weight of the hydrogenated block copolymer, 2 to 7 parts by weight of the polypropylene, 3 to 9 parts by weight of the polybutene, 20 to 30 parts by weight of a copolymer of monomers comprising ethylene and a $C_3$-$C_{12}$ alpha-olefin, 28 to 38 parts by weight of the flame retardant, 1 to 4 parts by weight of the ultraviolet absorbing agent, and 1 to 4 parts by weight of the poly(alkylene oxide).

Embodiment 12

The composition of embodiment 11, wherein the poly(phenylene ether) is a poly(2,6-dimethyl-1,4-phenylene ether) having an intrinsic viscosity of 0.35 to 0.5 deciliter per gram; wherein the hydrogenated block copolymer comprises a polystyrene-poly(ethylene/butylene)-polystyrene triblock copolymer; wherein the flame retardant comprises magnesium dihydroxide; wherein the ultraviolet absorbing agent comprises a triazine ultraviolet absorbing agent; wherein the poly(alkylene oxide) comprises a poly(propylene oxide) mono($C_1$-$C_{12}$-alkyl) ether; and wherein the copolymer of monomers comprising ethylene and a $C_3$-$C_{12}$ alpha-olefin comprises a copolymer of ethylene and 1-octene, and a maleic anhydride-grafted copolymer of ethylene and 1-octene.

Embodiment 13

An insulated conductor, comprising: a conductor; and an insulating covering disposed over the conductor; wherein the insulating covering comprises a composition comprising 15 to 45 parts by weight of a poly(phenylene ether); 5 to 50 parts by weight of a hydrogenated block copolymer of an alkenyl aromatic monomer and a conjugated diene; 1 to 15 parts by weight of a polypropylene; 2 to 10 parts by weight of a polybutene having a number average molecular weight of 500 to 1500 grams/mole; 10 to 45 parts by weight of a flame retardant; 0.5 to 10 parts by weight of an ultraviolet absorbing agent; and 0.5 to 10 parts by weight of a poly(alkylene oxide); wherein all parts by weight are based on 100 parts by weight total of flame retardants and polymers other than the poly(alkylene oxide).

Embodiment 14

The insulated conductor of embodiment 13, wherein the composition comprises 17 to 30 parts by weight of the poly(phenylene ether), 7 to 17 parts by weight of the hydrogenated block copolymer, 2 to 7 parts by weight of the polypropylene, 3 to 9 parts by weight of the polybutene, 20 to 30 parts by weight of a copolymer of monomers comprising ethylene and a $C_3$-$C_{12}$ alpha-olefin, 28 to 38 parts by weight of the flame retardant, 1 to 4 parts by weight of the ultraviolet absorbing agent, and 1 to 4 parts by weight of the poly(alkylene oxide).

Embodiment 15

The insulated conductor of embodiment 14, wherein the poly(phenylene ether) is a poly(2,6-dimethyl-1,4-phenylene ether) having an intrinsic viscosity of 0.35 to 0.5 deciliter per gram; wherein the hydrogenated block copolymer comprises a polystyrene-poly(ethylene/butylene)-polystyrene; wherein the flame retardant comprises magnesium dihydroxide; wherein the ultraviolet absorbing agent comprises a triazine ultraviolet absorbing agent; wherein the poly(alkylene oxide) comprises a poly(propylene oxide) mono($C_1$-$C_{12}$-alkyl) ether; and wherein the copolymer of monomers comprising ethylene and a $C_3$-$C_{12}$ alpha-olefin comprises a copolymer of ethylene and 1-octene, and a maleic anhydride-grafted copolymer of ethylene and 1-octene.

Embodiment 16

A jacketed cable, comprising: a conductor; an insulating covering surrounding the conductor; and a jacket surrounding the insulation; wherein the jacket comprises a composition comprising 15 to 45 parts by weight of a poly(phenylene ether); 5 to 50 parts by weight of a hydrogenated block copolymer of an alkenyl aromatic monomer and a conjugated diene; 1 to 15 parts by weight of a polypropylene; 2 to 10 parts by weight of a polybutene having a number average molecular weight of 500 to 1500 grams/mole; 10 to 45 parts by weight of a flame retardant; 0.5 to 10 parts by weight of an ultraviolet absorbing agent; and 0.5 to 10 parts by weight of a poly(alkylene oxide); wherein all parts by weight are based on 100 parts by weight total of flame retardants and polymers other than the poly(alkylene oxide).

Embodiment 17

The jacketed cable of embodiment 16, wherein the composition comprises 17 to 30 parts by weight of the poly(phenylene ether), 7 to 17 parts by weight of the hydrogenated block copolymer, 2 to 7 parts by weight of the polypropylene, 3 to 9 parts by weight of the polybutene, 20 to 30 parts by weight of a copolymer of monomers comprising ethylene and a $C_3$-$C_{12}$ alpha-olefin, 28 to 38 parts by weight of the flame retardant, 1 to 4 parts by weight of the ultraviolet absorbing agent, and 1 to 4 parts by weight of the poly(alkylene oxide).

Embodiment 18

The jacketed cable of embodiment 17, wherein the poly(phenylene ether) is a poly(2,6-dimethyl-1,4-phenylene ether) having an intrinsic viscosity of 0.35 to 0.5 deciliter per gram; wherein the hydrogenated block copolymer comprises a polystyrene-poly(ethylene/butylene)-polystyrene triblock copolymer; wherein the flame retardant comprises magnesium dihydroxide; wherein the ultraviolet absorbing agent comprises a triazine ultraviolet absorbing agent; wherein the poly(alkylene oxide) comprises a poly(propylene oxide) mono($C_1$-$C_{12}$-alkyl) ether; and wherein the copolymer of monomers comprising ethylene and a $C_3$-$C_{12}$ alpha-olefin comprises a copolymer of ethylene and 1-octene, and a maleic anhydride-grafted copolymer of ethylene and 1-octene.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Examples 1-8, Comparative Example 1

Components used to form the compositions are summarized in Table 1.

TABLE 1

| Component | Description |
|---|---|
| PPE | Poly(2,6-dimethyl-1,4-phenylene ether), CAS 25134-01-4, having an intrinsic viscosity of 0.46 deciliter/gram; obtained as PPO ™ 646 Resin from SABIC Innovative Plastics. |
| PPE—Si/PPE | A mixture of poly(2,6-dimethyl-1,4-phenylene ether) (CAS Reg. No. 24938-67-8) and poly(2,6-dimethyl-1,4-phenylene ether-polydimethylsiloxane block copolymer (CAS Reg. No. 1202019-56-4), the mixture having a polysiloxane content of about 5 weight percent and an intrinsic viscosity of about 0.40 deciliter per gram as measured in chloroform at 25° C.; prepared according to the procedure of U.S. Pat. No. 8,017,697 to Carrillo et al., Example 16. |
| S(EB)S 1 | Polystyrene-poly(ethylene-butylene)-polystyrene triblock copolymer, CAS Reg. No. 66070-58-4, having a polystyrene content of 27.7-30.7 weight percent and a melt flow of less than 1 gram per 10 minutes, measured at 230° C. and 5 kilogram load according to ASTM D1238; obtained as KRATON ™ G1650 Resin from Kraton Performance Polymers. |
| S(EB)S 2 | Polystyrene-poly(ethylene-butylene)-polystyrene triblock copolymer, CAS Reg. No. 66070-58-4, having a polystyrene content of 30-33 weight percent and a negligible melt flow, measured at 260° C. and 5 kilogram load according to ASTM D1238; obtained as KRATON ™ G1651 Resin from Kraton Performance Polymers. |
| S(EBS)S 1 | Polystyrene-poly(ethylene-butylene-styrene)-polystyrene tapered triblock copolymer, having a polystyrene content of 37 to 44 weight percent and a melt flow index of 7 grams per 10 minutes, measured at 260° C. and 5 kilogram load according to ASTM D1238; obtained as KRATON ™ A1536 HU Resin from Kraton Performance Polymers. |
| S(EBS)S 2 | Polystyrene-poly(ethylene-butylene-styrene)-polystyrene tapered triblock copolymer, having a polystyrene content of 56.3 to 60.3 weight percent and a melt flow index of less than 1 gram per 10 minutes, measured at 230° C. and 5 kilogram load according to ASTM D1238; obtained as KRATON ™ A1535 HU Resin from Kraton Performance Polymers. |
| TPE | A melt-kneaded blend comprising about 35 weight percent polystyrene-poly(ethylene-butylene)-polystyrene triblock copolymer (CAS Reg. No. 66070-58-4), about 20 weight percent ethylene-propylene copolymer (CAS. Reg. No. 9010-79-1), and about 45 weight percent mineral oil (CAS Reg. No. 72623-83-7); obtained as Sumitomo TPE-SB 2400 from Sumitomo Chemical Co., Ltd. |
| LLDPE | Linear low density polyethylene, having a melt flow index of 20 grams per 10 minutes, measured at 190° C. and 2.16 kilogram load according to ASTM D1238; obtained as M200024 Resin from SABIC. |
| Polypropylene | Propylene homopolymer, CAS Reg. No. 9003-07-0, having a melt flow index of 8 grams per 10 minutes, measured at 230° C. and 2.16 kilogram load according to ASTM D1238; obtained as PP 570P Resin from SABIC. |
| Polybutene | Polybutene, CAS Reg. No. 9003-29-6, having a kinematic viscosity of 100-125 centistokes at 100° C.; obtained as INDOPOL ™ H-50 from INEOS. |
| POE 1 | Poly(ethylene-co-1-octene), CAS Reg. No. 26221-73-8, having a melt flow of 1.1 grams per 10 minutes, measured at 190° C. and 2.16 kilogram load according to ISO 1133; obtained as QUEO ™ 8201 from Borealis. |
| POE 2 | Poly(ethylene-co-1-octene), CAS Reg. No. 26221-73-8, having a melt flow of 10 grams per 10 minutes, measured at 190° C. and 2.16 kilogram load according to ISO 1133; obtained as QUEO ™ 8210 from Borealis. |
| POE-g-MAH | Maleic anhydride-grafted poly(ethylene-co-1-octene), having a melt flow rate of 1.6 grams per 10 minutes, measured at 190° C. and 2.16 kilogram load according to ASTM D1238; obtained as FUSABOND ™ N493 from DuPont. |
| $Mg(OH)_2$ | Magnesium dihydroxide, CAS Reg. No. 1309-42-8, surface treated with aminosiloxane; obtained as MAGNIFIN ™ H-5IV from Albemarle. |
| $Al(OP(O)Et_2)_3$ | Aluminum tris(diethylphosphinate), CAS Reg. No. 225789-38-8; obtained as EXOLIT ™ OP1230 from Clariant. |
| MPP | Melamine polyphosphate, CAS Reg. No. 56386-64-2, obtained as BUDIT ™ 3141 from Budenheim Iberica, S.A. |
| Erucamide | Erucamide, CAS Reg. No. 112-84-5; obtained as KEMAMIDE ™ E Ultra from Crompton Corp. |
| TBPP | Tris(2,4-di-tert-butylphenyl) phosphite, CAS Reg. No. 31570-04-4; obtained as IRGAFOS ™ 168 from BASF. |
| CER | 3,4-Epoxycyclohexylmethyl 3,4-epoxycyclohexanecarboxylate, CAS Reg. No. 2386-87-0; obtained as CELLOXIDE ™ 2021P from Daicel Corp. |
| AO 1 | Reaction products of phosphorus trichloride with 1,1'-biphenyl and 2,4-bis(1,1-dimethylethyl)phenol, CAS Reg. No. 119345-01-6; obtained as HOSTANOX ™ P-EPQ ™ from Clariant. |
| AO 2 | 2',3-bis[[3-[3, 5-di-tert-butyl-4-hydroxyphenyl]propionyl]] propionohydrazide, CAS Reg. No. 32687-78-8; obtained as IRGANOX ™ MD 1024 from BASF. |

TABLE 1-continued

| Component | Description |
|---|---|
| AO 3 | Octadecyl-3-(3,5-di-tert-butyl-4-hydroxyphenyl) propionate, CAS Reg. No. 2082-79-3; obtained as IRGANOX ™ 1076 from BASF. |
| AO 4 | Pentaerythritol tetrakis(3,5-di-tert-butyl-4-hydroxyhydrocinnamate), CAS Reg. No. 6683-19-8; obtained as IRGANOX ™ 1010 from BASF. |
| Benzotriazole UVA | 2,2'-Methylene bis[4-(1,1,3,3-tetramethylbutyl)-6-(2H-benzotriazole-2-yl)phenol], CAS Reg. No. 103597-45-1; obtained as LA-31RG from Amfine Chemical Corporation, or as TINUVIN ™ 360 from BASF. |
| Triazine UVA 1 | 2-(4,6-Bis(2,4-dimethylphenyl)-1,3,5-triazin-2-yl)-5-(octyloxy)phenol, CAS Reg. No. 2725-22-6; obtained as CHIGUARD ™ 1064 from Chitec. |
| Triazine UVA 2 | 2-(4,6-Bis((1,1-biphenyl)-4-yl)-1,3,5-triazin-2-yl)-5-((2-ethylhexyl)oxy)phenol, CAS Reg. No. 204583-39-1; obtained as TINUVIN ™ 1600 from BASF. |
| PEO | Propylene oxide-initiated poly(ethylene oxide), having a number average molecular weight of about 600 grams/mole; obtained as POLYGLYKOL ™ PR 600 from Clariant. |
| PPO | Poly(propylene oxide) monobutyl ether, having a number average molecular weight of 1,100; obtained as POLYGLYKOL ™ B01/40 from Clariant. |
| P(EO—PO) 1 | Poly(ethylene oxide-propylene oxide), having a number average molecular weight of about 5,600 grams/mole, and an ethylene oxide to propylene oxide weight ratio of 2:1; obtained as POLYGLYKOL ™ D21/700 from Clariant. |
| P(EO—PO) 2 | Poly(ethylene oxide-propylene oxide), having a number average molecular weight of about 11,400 grams/mole, and an ethylene oxide to propylene oxide weight ratio of 4:1; obtained as PLURONIC ™ F88 from BASF. |
| P(EO—PO) 3 | Poly(ethylene oxide-propylene oxide) monobutyl ether, having a number average molecular weight of 1,600 and an ethylene oxide to propylene oxide weight ratio of 1:1; obtained as POLYGLYKOL ™ B11/70 from Clariant. |
| P(EO—PO) 4 | Poly(ethylene oxide-propylene oxide), pentaerythritol tetraether, having a number average molecular weight of 20,000 and an ethylene oxide to propylene oxide mole ratio of 4:1; obtained as POLYGLYKOL ™ P41/12000 from Clariant. |
| Fragrance | Polyethylene-encapsulated fragrance; obtained as POLYIFF ™ 7191-PBD from International Flavors and Fragrances Inc. |
| TiO$_2$ 1 | Titanium dioxide, CAS Reg. No. 13463-67-7; obtained as Ti-Pure ™ R 103-15 from DuPont. |
| TiO$_2$ 2 | Titanium dioxide, CAS Reg. No. 13463-67-7; obtained as TIOXIDE ™ R-TC30 from Huntsman |
| TiO$_2$ 3 | Titanium dioxide, CAS Reg. No. 13463-67-7; obtained as TIOXIDE ™ R-FCS from Huntsman |
| Carbon black | Carbon black, CAS Reg. No. 1333-86-4; obtained as MONARCH ™ 800 from Cabot. |
| Pigment Blue 29 | Pigment Blue 29, CAS Reg. No. 57455-37-5; obtained as Ultramarine 5085 from Holliday Pigments, a division of Huntsman. |
| Pigment Red 101 | Pigment Red 101, CAS Reg. No. 1309-37-1; obtained as BAYFERROX ™ 180M Pigment from Bayer. |

Compositions are summarized in Table 2, where component amounts are expressed in parts by weight per 100 parts by weight total of polymers (PPE-Si/PPE, S(EB)S 1, S(EB)S 2, Polypropylene, Polybutene, POE 1, POE 2, POE-g-MAH) and flame retardants (Mg(OH)$_2$). Note that poly(alkylene oxide)s are not included in the polymers component of the 100 parts by weight polymers and flame retardants.

Compositions were formed by melt mixing in a twin-screw extruder operating at zone temperatures from feed throat to die of 50° C., 180° C., 225° C., 245° C., 245° C., 245° C., 245° C., 245° C., 245° C., 245° C., 245° C., a die temperature of 255° C., a screw rotation rate of 400 rotations per minute, and a throughput of about 30 kilograms per hour. The extrudate was cooled and pelletized.

Prior to use for injection molding, pellets were dried for four hours at 80° C. Molded parts for property testing were injection molded using zone temperatures from feed throat to die of 235 to 250° C. in zones 1-3, a nozzle temperature of 245° C., a mold temperature of 40° C., a screw rotation rate of 100 rotations per minute, a back pressure of 90 kilogram force per centimeter$^2$, a holding time of 8 seconds, a cooling time of 20 seconds, an injection speed of 25 millimeters/second, a holding pressure of 600 kilogram force per centimeter$^2$.

Melt flow rate was determined according to ASTM D1238-13 at 250° C. and 10 kilogram load. CIELAB color parameters L*, a*, and b* were determined according to ASTM D2244-15a using a D65 standard illuminant. Ultraviolet aging was conducted according to ASTM D4459-12 using a radiant exposure of 36.5 watts/meter$^2$ at 300-400 nanometers, and an exposure time of 300 hours. Delta E*$_{ab}$, which is the color change associated with ultraviolet aging, was calculated according to ASTM D2244-15a using the equation, $$\text{Delta } E^*_{ab} = [(\Delta L^*)^2 + (\Delta a^*)^2 + (\Delta b^*)^2]^{1/2}.$$

Tensile properties were determined according to ASTM D638-14 at 23° C. using a Type I bar, a gage length of 50 millimeters, and a test speed of 50 millimeters/minute. Shore A hardness was determined according to ASTM D2240-15 at 23° C. and a sample thickness of 6.4 millimeters. Flexural properties determined according to ASTM D790-15e1 at 23° C. using bar cross-sectional dimensions of 6.4×12.7 millimeters, and a test speed of 12.5 millimeters/minute.

Insulated conductor samples, sometimes referred to as wire samples, were prepared for wire property testing and had a diameter of 2.25 or 2.70 millimeters and utilized a copper conductor having a diameter of 1.16 millimeters. Tensile properties of wire samples were determined according to UL 1581 using a test speed of 250 millimeters/minute, and preconditioning at 23° C. for 24 hours, or at 80 or 136° C. for 168 hours. Distortion of wire samples was determined according to UL 1581 using a temperature of 100 or 150° C., a weight of 300 grams, and a time of 1 hour.

Properties are summarized in Table 2. The results show that the Comparative Example 1 composition, without poly (alkylene oxide), exhibits a substantially greater color shift after UV exposure than any of the Examples 1-8 compositions. Comparison of Examples 2 and 3 shows that an increase in poly(alkylene oxide) content from about 2 to about 4 parts by weight is associated with increased UV stability, manifested as a drop in Delta $E^*_{ab}$ from 3.3 to 2.0. The best UV stability is exhibited by the Example 4 composition, containing about 2 parts by weight of a poly (propylene oxide) monobutyl ether. It exhibited a Delta $E^*_{ab}$ value of 1.4.

Examples 9-13, Comparative Examples 2-4

These examples illustrate the benefits of the invention in compositions in which the UV absorbing agent is a triazine compound.

Compositions are summarized in Table 3, where component amounts are expressed in parts by weight per 100 parts by weight total of polymers (PPE-Si/PPE, S(EB)S 1, S(EB)S 2, Polypropylene, Polybutene, POE 1, POE 2, POE-g-MAH) and flame retardants ($Mg(OH)_2$).

Figure 4:
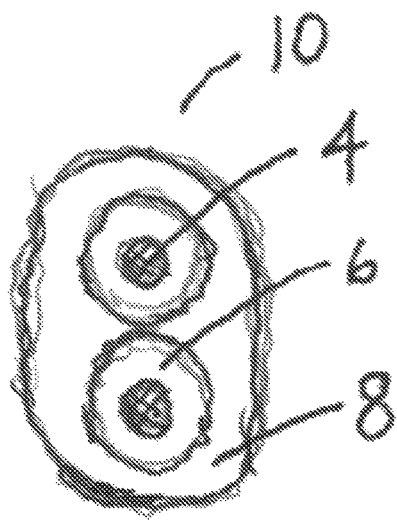
FIG. 4 is a cross-section of a jacketed cable.

Testing of jacketed cable was conducted with H03Z1Z1H2-F cable, which is similar to the cable depicted in FIGS. 3 and 4. The cable samples used for property testing had cross-sectional dimensions of 3.6 millimeters by 5.8 millimeters, corresponding to the exterior of the jacket. The insulation had an outer diameter of 2.25 millimeters, and the copper conductor was AWG 18 (1.02 millimeter diameter). The conductor, without preheating, was extrusion coated with molten insulation (obtained from SABIC as NORYL™ WCD933) at 245° C. to form insulated conductor. Two strands of insulated conductor were then extrusion coated with one of the jacket compositions detailed below at 245 C to form the cable.

TABLE 2

|  | C. Ex. 1 | Ex. 1 | Ex. 2 | Ex. 3 | Ex. 4 | Ex. 5 | Ex. 6 | Ex. 7 | Ex. 8 |
|---|---|---|---|---|---|---|---|---|---|
| COMPOSITIONS | | | | | | | | | |
| PPE—Si/PPE | 23.0000 | 22.4490 | 23.4694 | 23.9583 | 23.4694 | 23.4694 | 22.6804 | 23.4694 | 23.4694 |
| S(EB)S 1 | 6.0000 | 6.1224 | 6.1224 | 6.2500 | 6.1224 | 6.1224 | 6.1856 | 6.1224 | 6.1224 |
| S(EB)S2 | 6.0000 | 6.1224 | 6.1224 | 6.2500 | 6.1224 | 6.1224 | 6.1856 | 6.1224 | 6.1224 |
| Polypropylene | 3.0000 | 3.0612 | 3.0612 | 3.1250 | 3.0612 | 3.0612 | 3.0928 | 3.0612 | 3.0612 |
| Polybutene | 5.0000 | 5.1020 | 5.1020 | 5.2083 | 5.1020 | 5.1020 | 5.1546 | 5.1020 | 5.1020 |
| POE 1 | 7.0000 | 7.1429 | 7.1429 | 7.2917 | 7.1429 | 7.1429 | 7.2165 | 7.1429 | 7.1429 |
| POE 2 | 12.0000 | 12.2449 | 12.2449 | 10.4167 | 12.2449 | 12.2449 | 12.3711 | 12.2449 | 12.2449 |
| POE-g-MAH | 5.0000 | 5.1020 | 5.1020 | 5.2083 | 5.1020 | 5.1020 | 5.1546 | 5.1020 | 5.1020 |
| $Mg(OH)_2$ | 33.0000 | 32.6531 | 31.6327 | 32.2917 | 31.6327 | 31.6327 | 31.9588 | 31.6327 | 31.6327 |
| Erucamide | 0.3000 | 0.3061 | 0.3061 | 0.3125 | 0.3061 | 0.3061 | 0.3093 | 0.3061 | 0.3061 |
| TBPP | 0.7500 | 0.7653 | 0.7653 | 0.7813 | 0.7653 | 0.7653 | 0.7732 | 0.7653 | 0.7653 |
| AO 1 | 0.2500 | 0.2551 | 0.2551 | 0.2604 | 0.2551 | 0.2551 | 0.2577 | 0.2551 | 0.2551 |
| Benzotriazole UVA | 1.0000 | 1.0204 | 1.0204 | 1.0417 | 1.0204 | 1.0204 | 1.0309 | 1.0204 | 1.0204 |
| PEO | 0.0000 | 0.0000 | 0.0000 | 0.0000 | 0.0000 | 0.0000 | 0.0000 | 0.0000 | 2.0408 |
| P(EO—PO) 1 | 0.0000 | 0.0000 | 0.0000 | 0.0000 | 0.0000 | 0.0000 | 2.0619 | 0.0000 | 0.0000 |
| P(EO—PO) 2 | 0.0000 | 2.0408 | 2.0408 | 4.1667 | 0.0000 | 0.0000 | 0.0000 | 0.0000 | 0.0000 |
| PPO | 0.0000 | 0.0000 | 0.0000 | 0.0000 | 2.0408 | 0.0000 | 0.0000 | 0.0000 | 0.0000 |
| P(EO—PO) 3 | 0.0000 | 0.0000 | 0.0000 | 0.0000 | 0.0000 | 2.0408 | 0.0000 | 0.0000 | 0.0000 |
| P(EO—PO) 4 | 0.0000 | 0.0000 | 0.0000 | 0.0000 | 0.0000 | 0.0000 | 0.0000 | 2.0408 | 0.0000 |
| $TiO_2$ 1 | 8.1840 | 8.3510 | 8.3510 | 8.5250 | 8.3510 | 8.3510 | 8.4371 | 8.3510 | 8.3510 |
| Carbon black | 0.0003 | 0.0004 | 0.0003 | 0.0003 | 0.0003 | 0.0003 | 0.0004 | 0.0003 | 0.0003 |
| Pigment Blue 29 | 0.1074 | 0.1044 | 0.1096 | 0.1119 | 0.1096 | 0.1096 | 0.1055 | 0.1096 | 0.1096 |
| Pigment Red 101 | 0.0767 | 0.0731 | 0.0783 | 0.0799 | 0.0783 | 0.0783 | 0.0738 | 0.0783 | 0.0783 |
| PROPERTIES Composition and Molded Part Properties | | | | | | | | | |
| MFR (g/10 min) | 4.1 | 4.2 | 4.1 | 4.6 | 6.0 | 5.8 | 4.3 | 4.4 | 5.1 |
| Delta $E^*_{ab}$ | 5.5 | 2.9 | 3.3 | 2.0 | 1.4 | 1.9 | 2.1 | 2.5 | 1.6 |
| Tens. stress at break (MPa) | 14.8 | 13.4 | 11.8 | 10.2 | 12.5 | 12 | 11.9 | 12.1 | 13.8 |
| Tens. elong. at break (%) | 213 | 212 | 170 | 128 | 177 | 121 | 179 | 169 | 143 |
| Flex. modulus (MPa) | 45 | 44 | 51 | 53 | 58 | 90 | 61 | 60 | ND |
| Shore A hardness | 88 | 88 | 89 | 88 | 89 | 91 | 89 | 90 | 91 |
| Wire Properties (OD = 2.25 mm) | | | | | | | | | |
| Tens. strength (MPa), 23° C., 24 h | 19.4 | 16.5 | 18.2 | 16.8 | 19.5 | 20.7 | 16.3 | 16.8 | ND* |
| Tens. elong. (%), 23° C., 24 h | 230 | 261 | 267 | 253 | 309 | 269 | 286 | 275 | ND |
| Tens. strength (MPa), 80° C., 168 h | 19.7 | 17.3 | 18.8 | 17.6 | 20.4 | 21.7 | 17.6 | 17.6 | ND |
| Tens. elong. (%), 80° C., 168 h | 220 | 247 | 247 | 252 | 254 | 222 | 258 | 230 | ND |
| Deformation (%), 300 g, 100° C., 1 h | 24.2 | 28.2 | 26.8 | 19.3 | 25.6 | 19.6 | 25.3 | 25.3 | ND |

ND = not determined

Cable tensile elongation values were determined as follows. Two insulated wires were removed from a length of cable to leave only jacket. The jacket was secured on the clamps of the tensile machine with a gage length of 50 millimeters and tested at the speed of 250 millimeters/minute. The tensile elongation values were for elongation at break.

The cable vertical flame test was conducted according to EN50265-2-1. The test piece (complete cable) was secured to two horizontal supports so that the distance between the bottom of the upper support and the top of the lower support was 550±5 millimeters. The fire was applied in an angle of 45° C. to the vertical axis of the sample and lasted for 60 seconds. A sample passes the test if the distance between the lower edge of the top support and the onset of charring is greater than 50 millimeters. In addition, a sample fails the test if the burning extends downward to a point greater than 540 mm from the lower edge of the top support.

The results show that the use of a poly(alkylene oxide) improves the UV stability of poly(phenylene ether) compositions in which the UV absorber is a triazine compound. Specifically, the Delta $E^*_{ab}$ values for Comparative Example 2 and Example 9 are 1.6 and 1.1, respectively.

Examples 14 and 15, Comparative Example 5

These examples illustrate the benefits of the invention in compositions in which the poly(phenylene ether) is a homopolymer.

Compositions are summarized in Table 4, where component amounts are expressed in parts by weight per 100 parts by weight total of polymers (PPE; S(EBS)S 1; S(EBS)S 2; the S(EB)S and PP contents of TPE; Polypropylene; and Polybutene) and flame retardants ($Al(OP(O)Et_2)_3$ and MPP).

The VW-1 flammability test was conducted according to UL 1581, "Reference Standard for Electrical Wires, Cables, and Flexible Cords". A 455 millimeter length of jacketed cable was secured with its longitudinal axis vertical. A gas flame was applied to the sample five times for 15 seconds each time. Where any specimen showed more than 25 percent of the indicator flag burned away or charred after any of the five applications of flame, the sample was judged capable of conveying flame along its length and failed the test. Where any specimen emitted flaming or glowing particles or flaming drops at any time that ignited cotton below the sample, or continued to flame longer than 60 seconds after any application of the gas flame, the sample was judged capable of conveying flame to combustible materials in its vicinity and failed the test. Conversely, a sample passes the test if it does not exhibit any of the failure criteria described in this paragraph.

TABLE 3

|  | C. Ex. 2 | Ex. 9 | C. Ex. 3 | C. Ex. 4 | Ex. 10 | Ex. 11 | Ex. 12 | Ex. 13 |
|---|---|---|---|---|---|---|---|---|
| COMPOSITIONS | | | | | | | | |
| PPE—Si/PPE | 23.0000 | 23.0000 | 23.4694 | 20.0000 | 22.4490 | 22.4490 | 22.4490 | 22.4490 |
| S(EB)S 1 | 6.0000 | 6.0000 | 6.1224 | 6.0000 | 6.1224 | 6.1224 | 6.1224 | 6.1224 |
| S(EB)S 2 | 6.0000 | 6.0000 | 6.1224 | 6.0000 | 6.1224 | 6.1224 | 6.1224 | 6.1224 |
| LLDPE | 0.0000 | 0.0000 | 0.0000 | 0.0000 | 0.0000 | 0.0000 | 3.0612 | 0.0000 |
| Polypropylene | 3.0000 | 3.0000 | 3.0612 | 3.0000 | 3.0612 | 3.0612 | 0.0000 | 3.0612 |
| Polybutene | 5.0000 | 5.0000 | 5.1020 | 5.0000 | 5.1020 | 5.1020 | 5.1020 | 5.1020 |
| POE 1 | 7.0000 | 7.0000 | 7.1429 | 7.0000 | 7.1429 | 7.1429 | 7.1429 | 7.1429 |
| POE 2 | 12.0000 | 12.0000 | 10.2041 | 12.0000 | 12.2449 | 12.2449 | 12.2449 | 12.2449 |
| POE-g-MAH | 5.0000 | 5.0000 | 5.1020 | 5.0000 | 5.1020 | 5.1020 | 5.1020 | 5.1020 |
| $Mg(OH)_2$ | 33.0000 | 33.0000 | 33.6735 | 36.0000 | 32.6531 | 32.6531 | 32.6531 | 32.6531 |
| Erucamide | 0.3000 | 0.3000 | 0.3061 | 0.3000 | 0.3061 | 0.3061 | 0.3061 | 0.3061 |
| TBPP | 0.7500 | 0.7500 | 0.0000 | 0.0000 | 0.0000 | 0.0000 | 0.0000 | 0.0000 |
| AO 1 | 0.2500 | 0.2500 | 0.2551 | 0.2500 | 0.5102 | 0.2551 | 0.2551 | 0.5102 |
| AO 2 | 0.0000 | 0.0000 | 0.1020 | 0.1000 | 0.0000 | 0.0000 | 0.0000 | 0.0000 |
| AO 3 | 0.0000 | 0.0000 | 0.7653 | 0.7500 | 0.0000 | 0.0000 | 0.0000 | 0.0000 |
| AO 4 | 0.0000 | 0.0000 | 0.0000 | 0.0000 | 0.0000 | 0.7653 | 0.7653 | 0.0000 |
| Triazine UVA 1 | 2.0000 | 2.0000 | 0.0000 | 0.0000 | 0.0000 | 0.0000 | 0.0000 | 0.0000 |
| Triazine UVA 2 | 0.0000 | 0.0000 | 2.0408 | 4.0000 | 2.0408 | 2.0408 | 2.0408 | 2.0408 |
| P(EO—PO) 2 | 0.0000 | 2.0000 | 0.0000 | 0.0000 | 0.0000 | 0.0000 | 0.0000 | 0.0000 |
| PPO | 0.0000 | 0.0000 | 0.0000 | 0.0000 | 2.0408 | 2.0408 | 2.0408 | 2.0408 |
| $TiO_2$ 1 | 8.1840 | 8.1840 | 0.0000 | 0.0000 | 8.3510 | 6.2939 | 6.2939 | 6.2939 |
| $TiO_2$ 2 | 0.0000 | 0.0000 | 5.1020 | 5.0000 | 0.0000 | 0.0000 | 0.0000 | 0.0000 |
| Carbon black | 0.0003 | 0.0003 | 0.0000 | 0.0000 | 0.0003 | 0.0004 | 0.0004 | 0.0004 |
| Pigment Blue 29 | 0.1074 | 0.1074 | 0.0000 | 0.0780 | 0.1096 | 0.0839 | 0.0839 | 0.0839 |
| Pigment Red 101 | 0.0767 | 0.0767 | 0.0000 | 0.0410 | 0.0783 | 0.0629 | 0.0629 | 0.0629 |
| Fragrance | 0.0000 | 0.0000 | 0.0000 | 0.0000 | 0.0600 | 0.0000 | 0.0000 | 0.0000 |
| PROPERTIES | | | | | | | | |
| Composition and Molded Part Properties | | | | | | | | |
| MFR (g/10 min) | 5.2 | 4.7 | 6.5 | 6.0 | 6.4 | 9.3 | 8.9 | 8.3 |
| Delta $E^*_{ab}$ | 1.6 | 1.1 | 9.7 | 3.8 | 3.5 | 3.0 | ND | 3.6 |
| Tens. stress at break (MPa) | ND | ND | 13 | ND | 13.4 | 13.4 | 13.6 | 14.0 |
| Tens. elong. at break (%) | ND | ND | 147 | ND | 217 | 181 | 175 | 205 |
| Flex. modulus (MPa) | ND | ND | 66 | ND | ND | 55.2 | 52.2 | 50.9 |
| Shore A hardness | ND | ND | ND | ND | 88 | 88 | 88 | 88 |
| Cable Properties (H03Z1Z1H2-F) | | | | | | | | |
| Tens. elong. (%), 23° C., 24 h | ND | ND | ND | ND | 264 | ND | ND | ND |
| Tens. elong. (%), 80° C., 168 h | ND | ND | ND | ND | 222 | ND | ND | ND |
| Vertical Flame Test | ND | ND | ND | ND | Pass | ND | ND | ND |

Rigorous comparisons are not possible because of differences between the comparative and inventive compositions, but the results suggest that addition of poly(alkylene oxide) allows the UV absorber concentration to be decreased while still achieving better UV stability than a similar composition without poly(alkylene oxide). The addition of poly(alkylene oxide) was also associated with a higher melt flow rate.

TABLE 4

|  | C. Ex. 5 | Ex. 14 | Ex. 15 |
|---|---|---|---|
| COMPOSITIONS | | | |
| PPE | 27.0856 | 27.6855 | 27.6855 |
| S(EBS)S 1 | 17.3348 | 17.7187 | 17.7187 |
| S(EBS)S 2 | 13.0011 | 11.0742 | 11.0742 |
| TPE | 17.3348 | 17.7187 | 17.7187 |
| Polypropylene | 6.5005 | 6.6445 | 6.6445 |
| Polybutene | 8.1257 | 8.3056 | 8.3056 |
| Al(OP(O)Et$_2$)$_3$ | 9.2091 | 9.4131 | 9.4131 |
| MPP | 9.2091 | 9.4131 | 9.4131 |
| AO 1 | 0.2709 | 0.5537 | 0.5537 |
| AO 2 | 0.1083 | 0 | 0 |
| TBPP | 0.8126 | 0 | 0 |
| Erucamide | 0.4334 | 0.4430 | 0.4430 |
| CER | 0.5417 | 0.5537 | 0.5537 |
| Benzotriazole UVA | 2.7086 | 1.6611 | 1.6611 |
| P(EO—PO) 2 | 0 | 2.2148 | 0 |
| PPO | 0 | 0 | 2.2148 |
| TiO2 2 | 12.95775 | 0 | 0 |
| TiO2 3 | 0 | 13.2447 | 13.2447 |
| Carbon black | 0.0001 | 0.0001 | 0.0001 |
| Pigment Blue 29 | 0.1766 | 0.1805 | 0.1805 |
| Pigment Red 101 | 0.1239 | 0.1267 | 0.1267 |
| PROPERTIES | | | |
| Composition and Molded Part Properties | | | |
| MFR (g/10 min) | 4.9 | 9.8 | 11.3 |
| Delta E*$_{ab}$ | 1.5 | 1.2 | 0.6 |
| Tens. stress at break (MPa) | 17.4 | 10.1 | 15.7 |
| Tens. elong. at break (%) | 237 | 150 | 235 |
| Flex. modulus (MPa) | 28 | 28 | 28 |
| Shore A hardness | 81 | 83 | 83 |
| Wire Properties (OD = 2 7 mm) | | | |
| Tens. strength (MPa), 23° C., 24 h | 21.5 | 15.2 | 19.8 |
| Tens. elong. (%), 23° C., 24 h | 325 | 254 | 326 |
| Tens. strength (MPa), 136° C., 168 h | 22.5 | 15.5 | 19.6 |
| Tens. elong. (%), 136° C., 168 h | 265 | 190.3 | 241 |
| Deformation (%), 300 g, 150° C., 1 h | 28 | 30 | 33 |
| VW-1 Flame Test | Pass | ND | ND |

ND = not determined

The invention claimed is:

1. A composition, comprising:
15 to 45 parts by weight of a poly(phenylene ether);
5 to 50 parts by weight of a hydrogenated block copolymer of an alkenyl aromatic monomer and a conjugated diene;
1 to 15 parts by weight of a polypropylene;
2 to 10 parts by weight of a polybutene having a number average molecular weight of 500 to 1500 grams/mole;
10 to 45 parts by weight of a flame retardant;
0.5 to 10 parts by weight of an ultraviolet absorbing agent; and
0.5 to 10 parts by weight of a poly(alkylene oxide);
wherein all parts by weight are based on 100 parts by weight total of flame retardants and polymers other than the poly(alkylene oxide).

2. The composition of claim 1, wherein the poly(phenylene ether) is a poly(2,6-dimethyl-1,4-phenylene ether) having an intrinsic viscosity of 0.35 to 0.5 deciliter per gram.

3. The composition of claim 1, wherein the poly(phenylene ether) has an intrinsic viscosity of 0.35 to 0.5 deciliter per gram and comprises poly(phenylene ether) homopolymer and poly(phenylene ether)-polysiloxane block copolymer.

4. The composition of claim 1, wherein the flame retardant is selected from the group consisting of magnesium dihydroxides, metal dialkylphosphinates, melamine polyphosphates, and combinations thereof.

5. The composition of claim 1, wherein the ultraviolet absorbing agent is selected from the group consisting of benzotriazole ultraviolet absorbing agents, 2-(2'-hydroxyphenyl)-1,3,5-triazine ultraviolet absorbing agents, benzophenone ultraviolet absorbing agents, oxanilide ultraviolet absorbing agents, cyanoacrylate ultraviolet absorbing agents, and combinations thereof.

6. The composition of claim 1, wherein the poly(alkylene oxide) is selected from the group consisting of poly(ethylene oxide)s, poly(propylene oxide)s, random copolymers of ethylene oxide and propylene oxide, block copolymers of ethylene oxide and propylene oxide, monoalkyl ethers of the foregoing, dialkyl ethers of the foregoing, and combinations thereof.

7. The composition of claim 1, wherein the poly(alkylene oxide) has a number average molecular weight of 300 to 40,000 grams/mole.

8. The composition of claim 1, wherein the poly(alkylene oxide) comprises a poly(propylene oxide) mono($C_1$-$C_{12}$-alkyl) ether.

9. The composition of claim 1, further comprising 5 to 30 parts by weight of a copolymer of monomers comprising ethylene and a $C_3$-$C_{12}$ alpha-olefin.

10. The composition of claim 9, wherein the copolymer comprises a copolymer of ethylene and 1-octene, and a maleic anhydride-grafted copolymer of ethylene and 1-octene.

11. The composition of claim 1, comprising
17 to 30 parts by weight of the poly(phenylene ether),
7 to 17 parts by weight of the hydrogenated block copolymer,
2 to 7 parts by weight of the polypropylene,
3 to 9 parts by weight of the polybutene,
20 to 30 parts by weight of a copolymer of monomers comprising ethylene and a $C_3$-$C_{12}$ alpha-olefin,
28 to 38 parts by weight of the flame retardant,
1 to 4 parts by weight of the ultraviolet absorbing agent, and
1 to 4 parts by weight of the poly(alkylene oxide).

12. The composition of claim 11,
wherein the poly(phenylene ether) is a poly(2,6-dimethyl-1,4-phenylene ether) having an intrinsic viscosity of 0.35 to 0.5 deciliter per gram;
wherein the hydrogenated block copolymer comprises a polystyrene-poly(ethylene/butylene)-polystyrene triblock copolymer;
wherein the flame retardant comprises magnesium dihydroxide;
wherein the ultraviolet absorbing agent comprises a triazine ultraviolet absorbing agent;
wherein the poly(alkylene oxide) comprises a poly(propylene oxide) mono($C_1$-$C_{12}$-alkyl) ether; and
wherein the copolymer of monomers comprising ethylene and a $C_3$-$C_{12}$ alpha-olefin comprises a copolymer of ethylene and 1-octene, and a maleic anhydride-grafted copolymer of ethylene and 1-octene.

13. An insulated conductor, comprising:
a conductor; and
an insulating covering disposed over the conductor;
wherein the insulating covering comprises a composition comprising
15 to 45 parts by weight of a poly(phenylene ether);
5 to 50 parts by weight of a hydrogenated block copolymer of an alkenyl aromatic monomer and a conjugated diene;
1 to 15 parts by weight of a polypropylene;
2 to 10 parts by weight of a polybutene having a number average molecular weight of 500 to 1500 grams/mole;
10 to 45 parts by weight of a flame retardant;
0.5 to 10 parts by weight of an ultraviolet absorbing agent; and
0.5 to 10 parts by weight of a poly(alkylene oxide);
wherein all parts by weight are based on 100 parts by weight total of flame retardants and polymers other than the poly(alkylene oxide).

14. The insulated conductor of claim 13, wherein the composition comprises
17 to 30 parts by weight of the poly(phenylene ether),
7 to 17 parts by weight of the hydrogenated block copolymer,
2 to 7 parts by weight of the polypropylene,
3 to 9 parts by weight of the polybutene,
20 to 30 parts by weight of a copolymer of monomers comprising ethylene and a $C_3$-$C_{12}$ alpha-olefin,
28 to 38 parts by weight of the flame retardant,
1 to 4 parts by weight of the ultraviolet absorbing agent, and
1 to 4 parts by weight of the poly(alkylene oxide).

15. The insulated conductor of claim 14,
wherein the poly(phenylene ether) is a poly(2,6-dimethyl-1,4-phenylene ether) having an intrinsic viscosity of 0.35 to 0.5 deciliter per gram;
wherein the hydrogenated block copolymer comprises a polystyrene-poly(ethylene/butylene)-polystyrene;
wherein the flame retardant comprises magnesium dihydroxide;
wherein the ultraviolet absorbing agent comprises a triazine ultraviolet absorbing agent;
wherein the poly(alkylene oxide) comprises a poly(propylene oxide) mono($C_1$-$C_{12}$-alkyl) ether; and
wherein the copolymer of monomers comprising ethylene and a $C_3$-$C_{12}$ alpha-olefin comprises a copolymer of ethylene and 1-octene, and a maleic anhydride-grafted copolymer of ethylene and 1-octene.

16. A jacketed cable, comprising:
a conductor;
an insulating covering surrounding the conductor; and
a jacket surrounding the insulation;
wherein the jacket comprises a composition comprising
15 to 45 parts by weight of a poly(phenylene ether);
5 to 50 parts by weight of a hydrogenated block copolymer of an alkenyl aromatic monomer and a conjugated diene;
1 to 15 parts by weight of a polypropylene;
2 to 10 parts by weight of a polybutene having a number average molecular weight of 500 to 1500 grams/mole;
10 to 45 parts by weight of a flame retardant;
0.5 to 10 parts by weight of an ultraviolet absorbing agent; and
0.5 to 10 parts by weight of a poly(alkylene oxide);
wherein all parts by weight are based on 100 parts by weight total of flame retardants and polymers other than the poly(alkylene oxide).

17. The jacketed cable of claim 16, wherein the composition comprises
17 to 30 parts by weight of the poly(phenylene ether),
7 to 17 parts by weight of the hydrogenated block copolymer,
2 to 7 parts by weight of the polypropylene,
3 to 9 parts by weight of the polybutene,
20 to 30 parts by weight of a copolymer of monomers comprising ethylene and a $C_3$-$C_{12}$ alpha-olefin,
28 to 38 parts by weight of the flame retardant,
1 to 4 parts by weight of the ultraviolet absorbing agent, and
1 to 4 parts by weight of the poly(alkylene oxide).

18. The jacketed cable of claim 17,
wherein the poly(phenylene ether) is a poly(2,6-dimethyl-1,4-phenylene ether) having an intrinsic viscosity of 0.35 to 0.5 deciliter per gram;
wherein the hydrogenated block copolymer comprises a polystyrene-poly(ethylene/butylene)-polystyrene triblock copolymer;
wherein the flame retardant comprises magnesium dihydroxide;
wherein the ultraviolet absorbing agent comprises a triazine ultraviolet absorbing agent;
wherein the poly(alkylene oxide) comprises a poly(propylene oxide) mono($C_1$-$C_{12}$-alkyl) ether; and
wherein the copolymer of monomers comprising ethylene and a $C_3$-$C_{12}$ alpha-olefin comprises a copolymer of ethylene and 1-octene, and a maleic anhydride-grafted copolymer of ethylene and 1-octene.

* * * * *